United States Patent
Bodnar et al.

(10) Patent No.: US 6,658,268 B1
(45) Date of Patent: Dec. 2, 2003

(54) ENHANCED COMPANION DIGITAL ORGANIZER FOR A CELLULAR PHONE DEVICE

(75) Inventors: Eric O. Bodnar, Santa Cruz, CA (US); Shekhar Kirani, Capitola, CA (US); Philippe R. Kahn, Scotts Valley, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/369,812

(22) Filed: Aug. 6, 1999

Related U.S. Application Data

(63) Continuation-in-part of application No. 09/071,748, filed on May 1, 1998, now abandoned, and a continuation-in-part of application No. 09/071,732, filed on May 1, 1998, now Pat. No. 6,505,055, and a continuation-in-part of application No. 09/098,634, filed on Jun. 16, 1998, now abandoned.

(60) Provisional application No. 60/097,239, filed on Aug. 20, 1998, provisional application No. 60/107,269, filed on Nov. 4, 1998, and provisional application No. 60/107,151, filed on Nov. 4, 1998.

(51) Int. Cl.[7] ................................................ H04Q 7/20
(52) U.S. Cl. ........................ 455/556.2; 455/90; 455/566
(58) Field of Search .................................. 455/550, 556, 455/557, 575, 558, 566, 90, 556.2, 556.1

(56) References Cited

U.S. PATENT DOCUMENTS

| | | |
|---|---|---|
| 4,411,482 A | 10/1983 | Hoff |
| 4,769,796 A | 9/1988 | Levine |
| 4,866,611 A | 9/1989 | Cree et al. |
| 4,868,376 A | 9/1989 | Lessin et al. |
| 4,881,179 A | 11/1989 | Vincent |
| 4,977,520 A | 12/1990 | McGaughey, III et al. |
| 5,113,380 A | 5/1992 | Levine |
| 5,189,632 A | 2/1993 | Paajanen et al. |

(List continued on next page.)

*Primary Examiner*—Pablo N. Tran
(74) *Attorney, Agent, or Firm*—Hisashi D. Watanabe

(57) ABSTRACT

An enhanced "Camel-back" or "Companion" Digital Organizer (CDO) is described that is designed to interface to a cellular telephone. The CDO is preferably implemented as an add-on component which can be easily attached and detached from a phone by a user and, once in place, can dramatically enhance the phone's functionality by converting the phone into a "smart" phone. Exemplary features of the CDO include an ability for the user to initiate a voice call on the phone from the CDO. Preferably, the user may initiate the voice call from any of multiple modules of the user's data, and not merely from a phone-book module. The CDO is also capable of stand-alone use as a personal organizer device, apart from the phone. The CDO preferably includes a docking unit that removably mates to particular model(s) of phones, and a main unit that removably docks to the docking unit. The docking unit preferably includes substantially all phone-model-specific geometries and features to thereby allow the main unit to be configured for stand-alone use as an organizer with few compromises made to accommodate specific model(s) of phones. Furthermore, the same main unit is suitable for use with multiple docking units that are respectively adapted for different models of phones. Note that some phones have an "automatic hang-up" feature in which the phone unilaterally hangs up a phone call that was initiated by an external device (e.g., a modem or the CDO) upon detaching of the device by the user. For such phones, the docking unit remains attached to the phone during a call initiated by the user via the CDO, even if the user should detach the main unit for stand-alone use as an organizer. The still-attached docking unit contains sufficient circuitry and physical features to prevent automatic hang-up. The main unit includes many features such as a choice of both left- and right-handed modes and the capability for handling electronic mail, remote browsing, remote synchronization, caller identification, and the like.

17 Claims, 4 Drawing Sheets

U.S. PATENT DOCUMENTS

| | | | |
|---|---|---|---|
| 5,224,212 A | 6/1993 | Rosenthal et al. | |
| D339,139 S | 9/1993 | Jones et al. | |
| 5,249,218 A | 9/1993 | Sainto | |
| 5,348,347 A | 9/1994 | Shink | |
| 5,369,693 A | 11/1994 | Pillet et al. | |
| 5,390,320 A | 2/1995 | Smithline | |
| 5,392,390 A | 2/1995 | Crozier | |
| D361,754 S | 8/1995 | Jambhekar et al. | |
| 5,442,783 A | 8/1995 | Oswald et al. | |
| 5,519,606 A | 5/1996 | Frid-Nielsen et al. | |
| 5,522,089 A | 5/1996 | Kikinis et al. | |
| 5,533,097 A * | 7/1996 | Crane et al. | 455/552 |
| 5,602,963 A | 2/1997 | Bissonnette et al. | |
| 5,619,396 A | 4/1997 | Gee et al. | |
| 5,625,673 A | 4/1997 | Grewe et al. | |
| 5,664,013 A | 9/1997 | Rossi | |
| 5,664,228 A | 9/1997 | Mital | |
| 5,666,530 A | 9/1997 | Clark et al. | |
| 5,666,553 A | 9/1997 | Crozier | |
| 5,673,417 A | 9/1997 | Liao | |
| 5,675,524 A * | 10/1997 | Bernard | 708/109 |
| 5,684,990 A | 11/1997 | Boothby | |
| 5,701,423 A | 12/1997 | Crozier | |
| 5,706,509 A | 1/1998 | Man-Hak Tso | |
| 5,710,922 A | 1/1998 | Alley et al. | |
| 5,727,202 A | 3/1998 | Kucala | |
| 5,729,735 A | 3/1998 | Meyering | |
| 5,758,150 A | 5/1998 | Bell et al. | |
| 5,758,355 A | 5/1998 | Buchanan | |
| 5,761,667 A | 6/1998 | Koeppen | |
| 5,778,346 A | 7/1998 | Frid-Nielsen et al. | |
| 5,778,389 A | 7/1998 | Pruett et al. | |
| 5,790,817 A | 8/1998 | Asghar et al. | |
| 5,797,089 A * | 8/1998 | Nguyen | 455/403 |
| 5,812,870 A | 9/1998 | Kikinis et al. | |
| 5,813,009 A | 9/1998 | Johnson et al. | |
| 5,832,487 A | 11/1998 | Olds et al. | |
| 5,859,628 A * | 1/1999 | Ross et al. | 345/173 |
| 5,873,045 A * | 2/1999 | Lee et al. | 455/550 |
| 5,907,815 A | 5/1999 | Grimm et al. | |
| 5,913,214 A | 6/1999 | Madnick et al. | |
| 5,926,769 A | 7/1999 | Valimaa et al. | |
| 5,926,816 A | 7/1999 | Bauer et al. | |
| 5,929,774 A | 7/1999 | Charlton | |
| 5,933,778 A | 8/1999 | Buhrmann et al. | |
| 5,940,752 A | 8/1999 | Henrick | |
| 5,974,238 A | 10/1999 | Chase, Jr. | |
| 5,978,804 A | 11/1999 | Dietzman | |
| 5,983,073 A * | 11/1999 | Ditzik | 455/11.1 |
| 6,201,951 B1 * | 3/2001 | Duwaer et al. | 455/74.1 |
| D442,582 S * | 5/2001 | Lantin | D14/345 |
| 6,240,302 B1 * | 5/2001 | Harrison | 455/556 |
| 6,266,539 B1 * | 7/2001 | Pardo | 455/556 |

* cited by examiner

ENHANCED COMPANION DIGITAL ORGANIZER FOR A CELLULAR PHONE DEVICE

RELATED APPLICATIONS

The present application is related to, and claims the benefit of priority from, the following commonly-owned U.S. provisional patent applications, the disclosures of which are hereby incorporated by reference in their entirety, including any appendices or attachments thereof, for all purposes: serial No. 60/097,239, filed Aug. 20, 1998 and entitled Enhanced Camel-back Digital Organizer for a Cellular Phone Device; serial No. 60/107,269, filed Nov. 4, 1998 and entitled Companion Digital Organizer for a Cellular Phone Device; and serial No. 60/107,151, filed Nov. 4, 1998 and entitled Multi-component Interface Card Digital Organizer;

The present application is a continuation-in-part application of and claims the benefit of priority from, the following commonly-owned U.S. patent applications, the disclosures of which are hereby incorporated by reference in their entirety, including any appendices or attachments thereof, for all purposes: Ser. No. 09/071,748, filed May 1, 1998 now abandoned and entitled Camel-back Digital Organizer for a Cellular Phone Device; Ser. No. 09/071,732, filed May 1, 1998 now U.S. Pat. No. 6,505,055 and entitled Camel-back Digital Organizer and Communication Protocol for a Cellular Phone Device; and Ser. No. 09/098,634, filed Jun. 16, 1998 now abandoned and entitled Multi-component Interface Card Electronic Organizer.

The present application is also related to the following commonly-owned U.S. patent applications, the disclosures of which are hereby incorporated by reference in their entirety, including any appendices or attachments thereof, for all purposes: Ser. No. 09/187,007, filed Nov. 4, 1998 and entitled User Interface Methodology Supporting Light Data Entry for Microprocessor Device Having Limited User Input; Ser. No. 08/905,463, filed Aug. 4, 1997 and entitled User Interface Methodology for Microprocessor Device Having Limited User Input; Ser. No. 09/347,447, filed Jul. 3, 1999 and entitled System and Methods for Synchronizing Datasets Using Cooperation Among Multiple Synchronization Engines; Ser. No. 09/311,781, filed May 13, 1999 and entitled System and Methods for Synchronizing Datasets in a Non-FIFO or Otherwise Difficult Communication Environment; Ser. No. 09/208,815, filed Dec. 8, 1998 and entitled System and Methods for Robust Synchronization of Datasets; Ser. No. 09/136,215, filed Aug. 18, 1998 and entitled System and Methods for Synchronizing Two or More Datasets; and Ser. No. 08/923,612, filed Sep. 4, 1997 and entitled System and Methods for Synchronizing Information Among Disparate Datasets.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to electronic organizers and, more particularly, to apparatus and methods providing integration of electronic organizers with cellular phone devices.

With each passing day, there is ever increasing interest in providing integrated solutions for connected information appliances. Here, the general environment includes "appliances" in the form of electronic devices such as cellular phones, pagers, and battery-powered, hand-held devices (e.g., REX™, Palm Pilot™ and Windows™ CE devices). Such a device, in typical use, is occasionally connected to a desktop personal computer or PC, which stores information for a user. Still further, the PC may be connected to a server computer, which stores information important to the user's business. What the user wants is an integrated solution such that information of each device remains available for use in other devices in a convenient, transparent manner.

The user's wish for integration of personal information among devices is particularly noteworthy in connection with cellular phones, given their tremendous popularity. Although cellular phones are commonplace, a cellular phone user today finds that his or her device is not well integrated with other electronic devices. Consider, for instance, a user who maintains address-book or "contacts" information on a hand-held device. Despite having maintained extensive information about his or her contacts electronically, the user is forced to manually re-enter information into the cellular phone when placing a phone call. What the user wants instead is the ability to make calls and look up addresses and phone numbers, and even check schedules and send electronic mail, from a single integrated solution. Yet to date, designers have struggled over how to integrate disparate information—such as calendaring, scheduling, and contact information—among disparate devices.

What is needed is a solution which combines telephony with personal information management in a single integrated hand-held unit. Given the millions of cellular phones in service today, such a solution should comprise a user-serviceable attachment allowing a legacy phone to be upgraded to a "smart" phone without requiring a change to the underlying phone equipment (i.e., in a manner which maintains compatibility with legacy hardware) and without requiring a complicated installation procedure.

More particularly, what is needed is such an integrated solution that can enable a user to conveniently access information in the user-serviceable attachment even during an existing phone call and even on a phone (e.g., a legacy phone) that has "automatic hang-up" logic which causes the phone to unilaterally terminate an ongoing call if the logic believes that the phone is no longer being used. What is also needed is an integrated solution that is little encumbered during use or transport by model-specific restrictions imposed by particular phone model(s) and that can easily be used with multiple models of phones. In short, a solution is needed that can accommodate and work with as many models of phones as possible. Similarly, a solution is needed that can accommodate as many users as possible. For example, what is needed is a solution that is equally convenient for left-handed as well as right-handed users to use. The present invention fulfills these and other needs.

SUMMARY OF THE INVENTION

The present invention provides a Companion Digital Organizer (CDO) or system, that is designed to interface with a cellular phone to thereby provide integrated organizer/telephone functionality. The CDO is preferably configured to interface with the phone through an existing interface port (e.g., StarTac™ cellular port) in the phone.

The CDO is preferably implemented as an add-on component which can be easily attached and detached from a phone by a customer and, once in place, can dramatically enhance the phone functionality, converting the phone into a "smart" phone. In the preferred embodiment, the CDO is configured to attach to a cellular phone in the same manner as an auxiliary battery.

In an embodiment, the present invention includes a portable electronic organizer for independent operation and for operation with a portable telephone. The organizer includes a portable docking unit, a portable main unit, and logic. The portable docking unit is preferably configured to removably mate to the telephone. The portable main unit is preferably configured to removably dock to the docking unit. When the main unit is docked to the docking unit and the docking unit is mated to the telephone, the main unit is coupled to the telephone. The main unit includes a memory configured to store user data and a processor coupled to the memory. The logic is configured for the electronic organizer to initiate a voice telephone call over the telephone in response to user input related to the user data.

In an embodiment, the present invention includes a portable electronic organizer for independent operation and for operation with a portable telephone. The organizer includes a memory for storing user data, a display coupled to the memory, a communication coupler configured to interface with the portable telephone, and a processor, coupled to the memory and the display, configured to control, in response to user input, selective conveying of the user data to the user and instructing of the telephone via the communication coupler to initiate a phone call. The electronic organizer is capable of handheld use by a user for selectively accessing the user data while physically separate from the telephone, even during the phone call initiated by the telephone in response to the instructing by the processor.

An exemplary method for cooperatively using a portable phone and a portable electronic organizer that has a display includes the steps of: electively placing the portable electronic organizer into proximity with the portable phone to enable communication; displaying at the display first information comprising entries having corresponding phone number information; receiving first input that indicates a user request to dial a phone number associated with a particular entry of the displayed entries; and transmitting a first command from the electronic organizer to the phone for attempting to establish communication between the electronic organizer and the phone. The method further includes the steps of: if a communication can be established between the electronic organizer and the phone, transmitting in response to the user request a second command, from the electronic organizer to the phone, that instructs the phone to dial the phone number to thereby establish a phone call; during the established phone call, receiving second input indicating a user request to use the electronic organizer to view second information; and, in response to the second input, while at least a portion of the electronic organizer that includes the display is physically uncoupled from the phone, displaying at the electronic organizer the second information for viewing by the user while the user is actively engaged in the established phone call.

DETAILED DESCRIPTION OF A PREFERRED EMBODIMENT

Figure 1A:
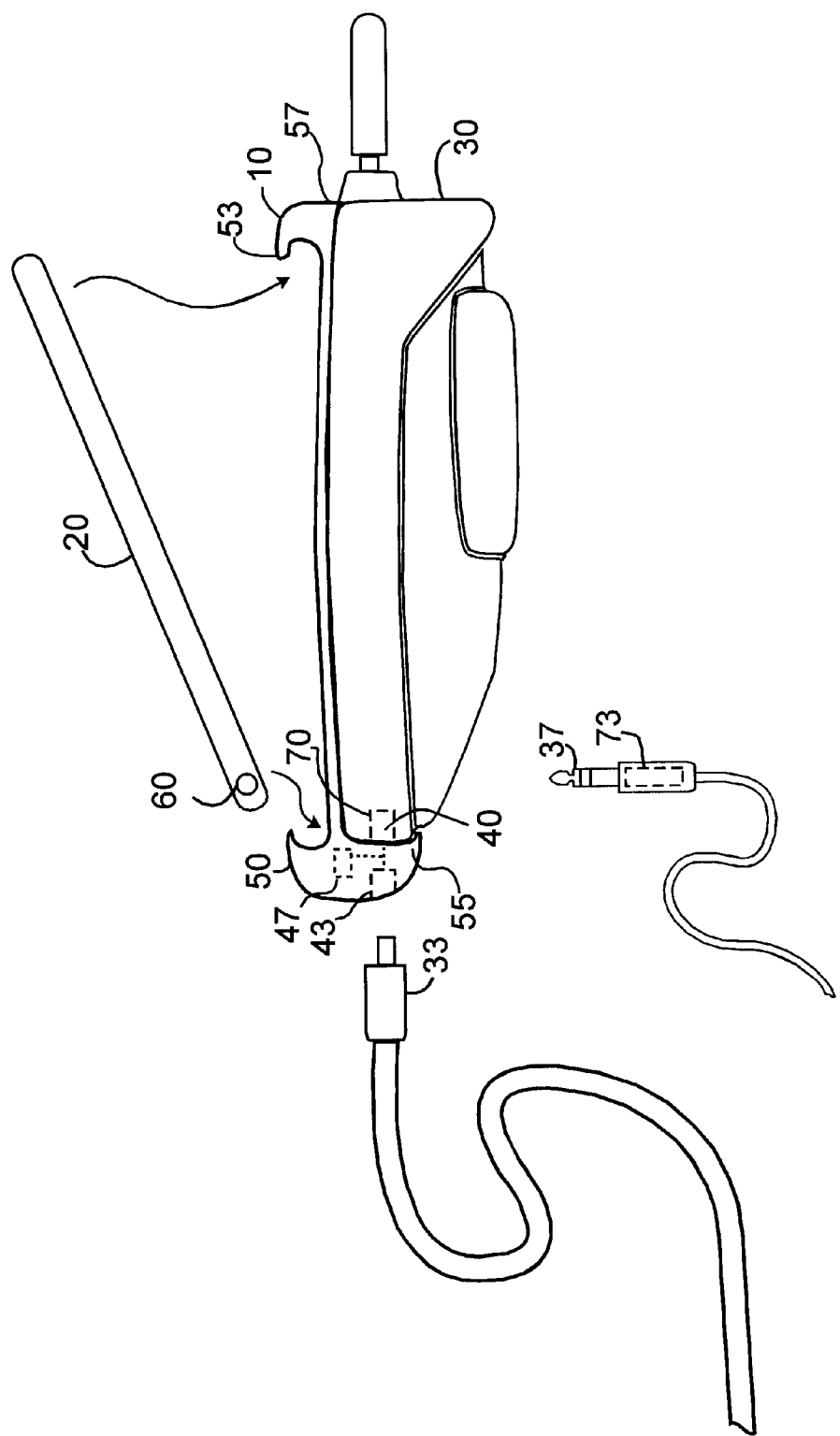
FIG. 1A illustrates a CDO in its environment according to an embodiment of the present invention in profile view.

The following description will largely focus on a digital organizer which has as its target or host phone the popular Motorola StarTAC® cellular phone. For this target phone, the design of a docking unit of the digital organizer largely matches the physical geometry of the StarTAC® cellular phone's auxiliary battery. The design, construction, and operation taught by the present invention are not limited, however, to StarTAC® cellular phones but can be applied advantageously to other phones, including ones of markedly different design and style. The following description of exemplary embodiments is, therefore, for the purpose of illustration and not limitation.

A. Introduction

Companion Digital Organizers ("CDOs"), which may also be called Camel-back Digital Organizers ("CDOs"), were disclosed in the above-incorporated, commonly-owned patent applications having Ser. No. 09/071,732 (filed May 1, 1998), Ser. No. 09/071,748 (filed May 1, 1998), and Ser. No. 09/098,634 (filed Jun. 16, 1998). As described in those documents, an embodiment of the CDO is a personal organizer device capable of stand-alone use that may be removably mated to a cellular phone to thereby make the phone a smart phone. For example, the CDO may store and selectively display, for example, an address-and-phone book, a schedule, a "to-do" list, a calendar, and more during stand-alone operation. When mated to a phone, the CDO may, for example, permit the user to navigate through his address-and-phone book to a particular contact and easily initiate a phone call from the CDO on the phone. Thereafter, the user may hold an ordinary voice phone conversation over the initiated phone call on the phone.

One aspect of the CDO is that, not only is it suitable for use with next-generation phones designed with the CDO in mind, the CDO may also mate with existing "legacy" phones to add new life to the legacy phones. To this end, the CDO may interface with a legacy phone via the phone's existing communication port, according to the phone's existing communication port protocol. Such an existing communication port was typically originally intended primarily for connection with a local computer modem coupled to a computer. In such originally-intended use, the local computer modem can instruct the phone to make (or receive) a phone call so that the local modem can exchange data via the phone (e.g., via the phone's communication port) to a remote party (e.g., a remote modem). In such a scenario, once the local modem is disconnected from the phone or turned off, the user most likely has no further use for any ongoing phone call that involved the phone's communication port.

Certain models of legacy cellular phones, for example, certain models of Motorola, Inc.'s StarTAC® phones, have built-in logic that automatically terminates a phone call involving the communication port when the phone detects that whatever device (e.g., local modem) was connected to the communication port for the phone call has been unplugged from the port or is otherwise no longer maintaining communication with the phone. Such built-in phone logic may be understandable in the context of typical data transfer phone calls involving a local modem coupled to a computer, as described earlier. Such built-in logic makes less sense for CDO-initiated voice phone calls, but is nevertheless generally not a problem for the CDO user, as long as the CDO device remains connected to the phone during a CDO-initiated phone call. However, if the CDO user wishes to detach the CDO device during a CDO-initiated phone call (for example, to look up his or her schedule on the CDO) and continue to talk on such a legacy phone, a problem may exist because the phone may terminate the phone call upon detaching of the CDO. This undesirable behavior of the legacy phone serves to negate an advantage of the basic CDO design, which is that the CDO is capable of being held and operated in one hand to leave the other hand free, for example, to hold the phone at ear-side during an ongoing call that was initiated by the CDO. (Motorola, Inc. is based in Schaumburg, Ill.)

Another potential usability issue with retrofitting a CDO onto legacy phones is that available existing attachment points, such as those for auxiliary batteries, may require model-specific pins, hooks, protrusions, or other features that may interfere with ergonomic use or carrying of the CDO. For example, protrusions may snag on items in a purse or pocket, or be otherwise inconvenient. The model-specific features may also hamper the CDO from being easily attached to other phone model(s).

A CDO according to a preferred embodiment of the present invention can enable a user to conveniently access the CDO for ordinary use as an organizer even during an existing CDO-initiated phone call and even on a phone (e.g., a legacy phone) having the above-described "automatic hang-up" logic. The preferred CDO is little encumbered during use or transport by model-specific restrictions imposed by particular phone model(s) and can easily be used with multiple models of phones. In short, the preferred CDO can accommodate and work with as many models of target phones as possible. Furthermore, the preferred CDO can accommodate as many users as possible. For example, the preferred CDO is equally convenient for left-handed as well as right-handed users to use.

B. Device Hardware and Software

As will be further described, an enhanced CDO according to an embodiment of the present invention includes a docking unit and a detachable main unit. The docking unit and the main unit together include the elements of a CDO that are described in the incorporated, commonly-owned patent applications, e.g., the applications having Ser. No. 09/071,732 (filed May 1, 1998), Ser. No. 09/071,748 (filed May 1, 1998), and Ser. No. 60/107,269 (filed Nov. 4, 1998). In particular, the docking unit and the main unit together include a central processing unit (CPU), a memory, a display, a user input (e.g., terse keyset), a serial port, software, and couplers (e.g., physical and electrical) for mating and interfacing the CDO to a host phone.

The (enhanced) CDO's software includes a device operating system and organizer application(s), such as are described in the incorporated, commonly-owned patent applications, e.g., the applications having Ser. No. 09/187,007 (filed Nov. 4, 1998) and Ser. No. 08/905,463 (filed Aug. 4, 1997). Preferably, the organizer application(s) include a calendar/appointments module, an address-book (phonebook) module, a task-list module, a memos module, a world-clock module, and a preferences module. Preferably, these modules include the features and capabilities as described in the incorporated patent applications and additional features and capabilities as described in the present document. Some features and capabilities as described in the incorporated patent application are found, for example, in the popular StarTAC® clipOn Organizer and the REX PRO™ organizer. The StarTAC® clipOn Organizer includes licensed technology from Starfish Software, Inc. ("Starfish"), the present assignee, and is available from Motorola, Inc. The REX PRO™ organizer (e.g., model REX PRO 5) includes licensed technology from Starfish, the present assignee, and is available from Franklin Electronic Publishers of Burlington, N.J. StarTAC is a registered trademark of Motorola, Inc. REX and REX PRO are trademarks of Franklin Electronic Publishers.

The docking unit and the main unit may also together include the elements of a multi-component embodiment of the CDO, as described in the incorporated, commonly-owned patent application having Ser. No. 09/098,634 (filed Jun. 16, 1998) and Ser. No. 60/107,151 (filed Nov. 4, 1998). In particular, the main unit may itself include two components: an outer component, for providing the display and other bulky elements, and a detachable interface component, for interfacing with other devices such as handheld or notebook personal computers. The interface component preferably includes memory (e.g., flash memory) and is preferably configured to interface with the other devices according to a standard interface (e.g., a CompactFlashυ PC-card interface), the specifications of which are available from the CompactFlash Association of Palo Alto, Calif. CompactFlash is a trademark of the CompactFlash Association.

C. The Enhanced CDO Preferably Includes a Docking Unit and a Main Unit

FIG. 1A illustrates an enhanced CDO in its environment according to an embodiment of the present invention in profile view. The enhanced CDO includes a docking unit 10 and a detachable main unit 20, which together include the elements of a CDO as described above. The environment of the enhanced CDO (hereinafter, "CDO") includes a target phone 30, a communication connector 33 from another device (not shown), and a serial interface plug 37. The CDO's docking unit 10 includes a communication connector 40, a pass-through communication port 43, a "hand-holding" module 47, connectors 50 and 53 for accepting the main unit 20 for docking, and connectors 55 and 57 for removably (and rigidly) mating the docking unit 10 to the target phone 30. The main unit 20 includes a serial port 60 and user interface and other elements (e.g., display, input keys, buzzer, processor, battery, and the like) not shown in FIG. 1A, which have all been described in the patent applications incorporated by reference. The target phone may be a legacy phone, for example, a Motorola StarTAC® cellular phone, that was designed without the CDO in mind. The target phone includes a communication port 70 (dashed lines). The serial interface plug 37 may be an ordinary serial plug (e.g., a stereo phono-style plug) as described in the patent applications incorporated by reference. The serial interface plug 37 may alternatively be a specialized serial plug that includes a serial controller chip 73, for example a "Maxim" serial controller chip, such that the specialized serial plug acts as a "cradle" for serial communications, as described, for example, in the incorporated, commonly-owned patent applications, for example, the application having Ser. No. 09/098,634 (filed Jun. 16, 1998). (The specialized serial plug may have more than only two contacts (e.g., six contacts) with the serial port 60. Thus, the drawing of the serial interface plug 37 in FIG. 1A is merely a schematic picture.)

D. The Docking Unit Mates to the Phone and Accepts the Main Unit for Docking

As shown in FIG. 1A, the docking unit 10 is configured to be detachably mated to the target phone. When the docking unit 10 is mated to the target phone, the docking unit 10's communication connector 40 (e.g., an electrical coupler) connects to (e.g., inserts into) the target phone's communication port 70. When the main unit 20 is docked into the docking unit 10, and the docking unit 10 is mated to the host phone 30, the user may initiate a phone call from the CDO. The CDO's docking unit 10's pass-through communication port 43 (dashed lines) is connected to the communication connector 40 and is wired to act as an "extension cord," so that, even when the CDO's docking unit 10 is mated to the target phone, an external device (not shown) can still couple to the target phone's communication port 70, via the connector 33 and the pass-through communication port 43 of the docking unit 10, without having to remove the docking unit 10 from the target phone 30. For circuit and signal protection, the pass-through communication port 43 may be switched off (e.g., electrically isolated) from the communication port 70 and from the CDO's circuitry when the CDO is sending signals to the port 70, for example, when the CDO is instructing the target phone 30 to begin a phone call, or when the CDO has requested exclusive access to the port 70.

The mechanism by which the docking unit 10 is mated to any target phone depends on the design specification of the target phone. For example, if the target phone is a StarTAC® cellular phone, then the docking unit 10 would be configured to mate to the target phone largely in the manner of the StarTAC® cellular phone's standard auxiliary battery. In particular, the docking unit 10's connector 57 for mating to the target StarTAC® phone would include a metal spring connector which grips the top (antenna end) of the phone and which extends to allow the user to line up and attach the docking unit 10's communication connector 40 to the standard communication port at the bottom of the phone. Further, the connector 55 for mating to the target phone would include two plastic connectors (e.g., pegs) which fit into slots on the phone and hold the docking unit 10 in place with tension being provided by the spring connector 57.

Depending on the particular design specification of the target phone, the communication connector 40 may include, for example, about five electrical conductors, or the like, that make contact with corresponding conductors in an interface port in the target phone. The communication connector 40 may also be an elastomeric or similar plastic-or-rubber-covered coupler, an infrared or other type of wireless coupler (e.g., a radio-frequency transmitter) for wirelessly communicating with the target phone (e.g., within a distance of about a meter), or the like, according to the particular design specification of the target phone. (Elastomeric couplers are further discussed, for example, in connection with the Miniature Card interface specification of Intel Corporation of Santa Clara, Calif., which interface specification is further discussed, for example, in the incorporated, commonly-owned patent application having Ser. No. 09/098,634 (filed Jun. 16, 1998). The mating of a CDO to target phones, including the StarTAC® cellular phone, is further described in the incorporated patent application having Ser. No. 09/071,732 (filed May 1, 1998).

E. The Docking Unit Prevents Automatic Hang-ups and Enhances Portability

1. Overview

The hand-holding module 47 is a circuit or other element or feature that tells the target phone that the communication port 70 is still being used, so that the target phone 30's control logic does not automatically terminate a phone call initiated via the communication port 70 by the CDO, even if the CDO's main unit 20 is detached during such a phone call. Instead, the user would terminate the phone call in a usual manner, as if the phone call were an ordinary phone call initiated by the user via manual dialing. The hand-holding module 47, if it requires power for operation, may steal power from the host phone's communication port, or may be powered by a power supply (e.g., battery) on the docking unit 10.

2. Example Embodiment: Docking Unit Provides Acknowledgment Signals

The precise structure or programming of the hand-holding module 47 depends on the specification of the target phone. For example, a target phone may periodically send a request for acknowledgment (e.g., an "are you there"-type query) to a device (e.g., a modem or a CDO) connected to the phone's communication port 70, according to the phone's communication protocol. If this target phone does not receive any acknowledgment from the device, the target phone would terminate any call involving the device (e.g., initiated or received due to the device). A docking unit 10 that targets such a target phone would include a hand-holding module 47 that is a circuit (e.g., a microcontroller such as a PIC chip) configured to (e.g., programmed to) simply respond to such a specified query with a suitable acknowledgment (e.g., an "I am here"-type response), even after the main unit 20 has been detached during a call that involves (e.g., is initiated by) the CDO.

3. Example Embodiment: Docking Unit Simulates Communication Traffic

For another example, a target phone may passively monitor the sending of data or other signals (e.g., "I am here"-type signals) by a device (e.g., a modem or a CDO) connected to the phone's communication port 70. If this target phone notices no such signals over the communication port 70 over a specified time span, the phone would terminate an ongoing call that involves the device. A docking unit 10 that targets such a target phone would include a hand-holding module 47 that is a circuit configured to periodically send such a suitable signal so that the target phone would know that any existing CDO-initiated phone call should not be automatically hung up, even after the main unit 20 has been detached during a call that involves (e.g., is initiated by) the CDO.

4. Example Embodiment: Docking Unit Provides Physical or Other Presence

For yet another example, a target phone may simply determine whether a device (e.g., a modem or a CDO) is physically connected to the communication port 70, in deciding whether to hang up an externally-initiated phone call. This physical determination may be based on a mechanical switch, a measurement of electrical load, e.g., on data-carrying or on dedicated connector pins in the port 70, or the like. A docking unit 10 that targets such a target phone would include a hand-holding module 47 that is merely the connector 40 itself, or a suitably connected circuit or structure (e.g., one that includes an electrical resistor, capacitor, signal generator, or other suitable element), as is appropriate for the target phone's specification or design.

5. Further Remarks

Depending on the particular automatic hang-up logic employed by the target phone 30, the hand-holding module 47 may even be operational even when the main unit 20 has not been detached from the docking unit 10. In summary, the CDO is made safe against undesirable automatic hang-ups by the target phone 30, even if the main unit 20 is detached for use as an organizer during a phone call. In addition, the automatic hang-up feature is still available for its intended purpose, when the CDO is not being used. Furthermore, the main unit 20 is made capable of being configured for ease of use and carrying by the user, largely independently of the particular attachment geometry dictated by the target phone 30.

F. Main Unit is Usable with Multiple Phone Models; Docking Unit is Model(s)-specific A single main unit 20 is able to removably attach to a variety of docking units, wherein each docking unit is designed for a particular model, or set of models, of target phone. In this way, the user's investment in the CDO is largely protected, even if he or she buys a new model of cellular phone. In particular, if the user buys a new model of cellular phone, he or she could simply buy a new model-specific docking unit to use with the existing main unit 20. Such a course of action would be cheaper than buying an entirely new CDO, and would be more convenient than having to coordinate the use of two wholly-separate CDOs.

In general, the CDO may be used with host phones that employ either analog technology (e.g., AMPS—Advanced Mobile Phone Service) or digital technology (e.g., CDMA—Code Division Multiple Access, TDMA—Time Division Multiple Access, or GSM—Global System for Mobile Communications). A particular embodiment of the CDO as shown in FIG. 1A or as shown in the incorporated, commonly-owned patent applications, e.g., the applications having Ser. No. 09/071,732 (filed May 1, 1998) and Ser. No. 09/098,634 (filed Jun. 16, 1998), includes browser software and electronic mail (e-mail) software in its program memory such that the software can direct the CDO's processor to engage in communication with a remote host computer to exchange e-mail or to browse remote information on the Internet, an intranet, or the like. If the particular embodiment is to be used with analog phones, it also includes a modem, coupled to its processor, that handles communication with the remote host.

G. The Main Unit Docks to the Docking Unit via a Docking Interface

1. Overview

Figure 1B:
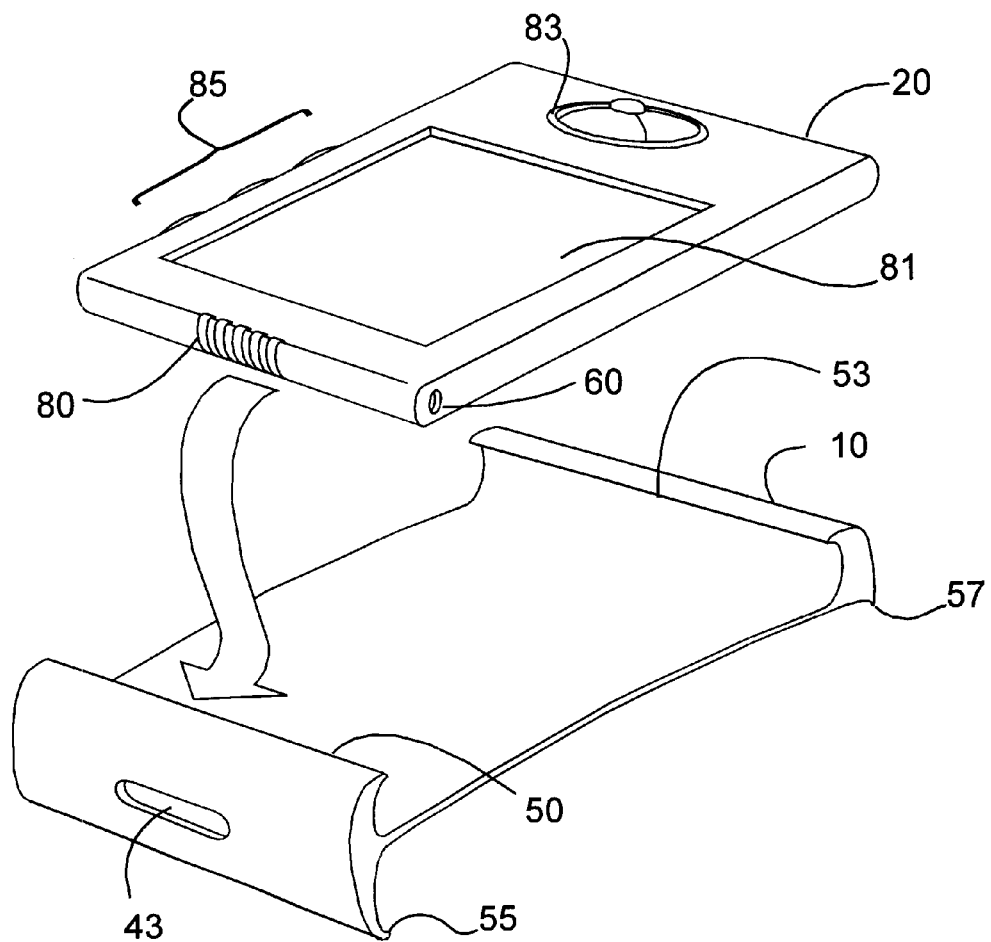
FIG. 1B illustrates the CDO of FIG. 1A in perspective view.

FIG. 1B illustrates the CDO of FIG. 1A in perspective view. Most features of FIG. 1B have already been described in connection with either FIG. 1A, or in the patent applications incorporated by reference, and need not be described again in detail. Elements of the CDO that were labeled in FIG. 1A retain their numeric labels in FIG. 1B. These elements include the docking unit 10, the main unit 20, the pass-through communication port 43, the connectors 50 and 53, the connectors 55 and 57, and the serial port 60 of the main unit 20. As shown in FIG. 1B, the CDO's main unit 20 also includes an interface coupler 80 for conveying signals between the main unit 20 and the docking unit 10 which conveys the signals to and from the target phone (not shown in FIG. 1B). The main unit 20 further includes user inputs and a display 81. The user inputs are shown as physical "Navi-disk" input keys 83 and additional keys 85. The Navi-disk input keys 83 include directional keys (e.g., FORWARD, BACKWARD, and, optionally, UP and DOWN) and a selection key (e.g., ENTER). The additional keys 85 preferably include about four keys that are preferably programmed for invoking HOME/PREVIOUS, CHANGE-VIEW, EDIT, and DIAL-NUMBER commands. The input and navigation functionality of the inputs and the display 81 are further described, for example, in the incorporated, commonly-owned patent applications having Ser. No. 60/107,269 (filed Nov. 4, 1998), Ser. No. 09/071, 732 (filed May 1, 1998), Ser. No. 09/187,007 (filed Nov. 4, 1998), and Ser. No. 08/905,463 (filed Aug. 4, 1997).

The interface coupler 80 may include, for example, about five electrical conductors, or the like, that make contact with corresponding conductors (not shown) in the docking unit 10. The corresponding conductors cannot be seen in FIG. 1B, but would be on the hidden (in FIG. 1B) side of the connector 50. The interface coupler 80 may also be an elastomeric or similar plastic-or-rubber-covered coupler, an infrared or other type of wireless coupler (e.g., a radio-frequency transmitter) for wirelessly communicating (e.g., within a distance of about a meter) with the docking unit 10 and other devices, or the like. Whatever the form of the interface coupler 80, it interfaces with the target phone preferably via the docking unit which functions as a conduit. For example, the interface coupler 80 may interface with a corresponding coupler (not shown) in the docking unit, for example, on the hidden (in FIG. 1B) side of the connector 50 so that the docking unit conveys signals between the main unit 20 and the target phone and preferably performs any necessary protocol-translating functions (e.g., to handle phone-model-specific protocol issues).

2. The Main Unit May Have Interface-card Form, Like the REX™ Organizer

At least a portion of the main unit 20, including the interface coupler 80, may conform to the electrical and mechanical specification of a PC-Card connector, or other interface card connector. For example, the main unit 20 may have a form factor (e.g., size, shape, configuration) and data synchronization scheme that is functionally similar to those of the PC-Card-shaped (Type II) REX PRO™ electronic organizer or the REX™ electronic organizer, e.g., model REX-3, which are available from Franklin Electronic Publishers of Burlington, N.J., and embody licensed technology from Starfish, the present assignee. The REX™ organizer is described for example in the incorporated, commonly-owned patent applications having Ser. No. 09/098,634 (filed Jun. 16, 1998) and Ser. No. 08/905,463 (filed Aug. 4, 1997).

3. The Main Unit May Itself Have a Detachable Interface-card Component

As mentioned above, the main unit 20 may itself include two components: an outer component, for providing the display and other bulky elements, and a detachable interface component, for interfacing with other devices such as handheld or notebook personal computers. As mentioned above, such a two-component organizer is further discussed in the incorporated, commonly-owned patent application having Ser. No. 09/098,634 (filed Jun. 16, 1998) and Ser. No. 60/107,151 (filed Nov. 4, 1998). The interface component preferably includes memory (e.g., flash memory) and is preferably configured to interface with the other devices according to a standard interface (e.g., a CompactFlash™ PC-card interface).

H. The CDO (e.g., the Main Unit) Synchronizes Information with Other Datasets

1. Overview

Typically, the CDO is used along with other information devices, such as desktop, notebook, or handheld personal computers (PCs), server computers (e.g., Internet server computers), and the like. Each device includes a copy, or version, of the user's information that is found in the CDO. In general, information may be altered on any of the user's information devices independently of the other information devices. Thus, the information in the devices typically should be periodically synchronized.

2. Multiple Communication Paths May Exist for Synchronization

The CDO may synchronize with other information devices via its serial port 60. In addition, particular above-described embodiments of the CDO may synchronize with other information devices in other ways. For example, consider again the embodiment of the CDO in which the main unit 20 itself (or at least one end of it) has the form factor of an interface card (e.g., a PC-card). Such a main unit 20 may synchronize with other devices in a manner similar to the REX™ electronic organizer—e.g., by inserting at least one end of the main unit 20 (the end with the interface coupler 80) at least partially into the interface-card port of a PC or similar device. For another example, consider again the embodiment of the CDO in which the main unit 20 itself includes a detachable interface module (e.g., a module having an end that conforms to an interface specification such as the CompactFlash™ PC-card specification). Such a main unit 20 may synchronize with other devices by inserting at least one end of the main unit 20's interface module into the interface-card port of a PC or similar device, as discussed, for example, in the incorporated, commonly-owned patent application having Ser. No. 09/098,634 (filed Jun. 16, 1998). For yet another example, consider again the embodiment of the CDO in which the CDO is capable of engaging in communication (e.g., cellular wireless communication) with a remote computer via the CDO's host phone (e.g., via a built-in modem in the CDO). Such a CDO may synchronize with another information device, e.g., an Internet server computer, or the like, via the host phone (e.g., wirelessly) through a communication network (e.g., a public telephone network).

3. Choose a Synchronization Method Optimized for the Communication Path

The CDO may use any suitable synchronization method to synchronize with other information devices. For example, the CDO may use any of the synchronization methods that are described in the incorporated, commonly-owned patent applications having Ser. No. 09/347,447 (filed Jul. 3, 1999), Ser. No. 09/311,781 (filed May 13, 1999), Ser. No. 09/208,815 (filed Dec. 8, 1998), Ser. No. 09/136,215 (filed Aug. 18, 1998), and Ser. No. 08/923,612 (filed Sep. 4, 1997). In particular, if the CDO is to synchronize wirelessly, e.g., via the host phone, then the CDO preferably uses the synchronization methods that are identified as especially suitable to wireless synchronization in, for example, the incorporated, commonly-owned patent application having Ser. No. 09/311,781 (filed May 13, 1999).

I. Further Usability Features

1. An Included Battery Provides Auxiliary Power to the Host Phone

A particular embodiment of the CDO as shown in FIG. 1A includes an auxiliary power supply (e.g., battery) that provides power to the host phone. Preferably, the auxiliary power supply resides in the docking unit 10, but the auxiliary power supply may also reside in the main unit 20. Power from the auxiliary power supply is routed to the host phone using the host phone's existing auxiliary power input point. The main unit 20 includes its own power supply for stand-alone operation, but may also use power from an auxiliary power supply that exists on the docking unit 10, or may use power from the host phone (e.g., via a dedicated power line or an ordinary signal line in the communication port 70) in particular embodiments.

2. Left-handed and Right-handed Modes Are Provided

During use by a right-handed user, the CDO is by default in a right-handed mode. In this mode, as the user views the CDO's display 81, the CDO's main navigation inputs (e.g., the Navi-disk keys 83) preferably face the user and reside to the right of the display 81. Thus, the user can hold the CDO's main unit 20 in his or her right hand and use at least the main navigation inputs using his or her right thumb. This leaves the user's left hand free, for example, to hold the CDO's host phone at ear-side during a call that was initiated by the CDO.

According to an embodiment of the present invention, the user can give a command to the CDO's main unit 20 to enter into a left-handed mode, e.g., via the above-mentioned preferences software module or using a hardware switch located somewhere on the CDO. In the left-handed mode, the display 81's screen coordinate system is re-mapped such that all text images are effectively rotated about 180 degrees to display "upside-down". Thus, a left-handed person can easily hold the CDO "upside down" in his or her left hand and see a correct display. In this-left-handed position, as the user views the CDO's display, the main navigation inputs (e.g., the Navi-disk keyset 83) face the user and reside to the left of the display 81. Thus, the user can hold the CDO's main unit 20 in his or her left hand and use at least the main navigation inputs using his or her left thumb. The screen coordinate-system is re-mapped, for example, by setting a register or switch coupled to display controller circuitry within the main unit 20. In a particular embodiment, the CDO re-maps the coordinate system by switching the direction of a serial latch in a horizontal display driver chip so that the chip renders backwards. Then the software compensates in the vertical direction by using negative raster offsets rather than positive offsets. In an alternate embodiment, the display is configured within the housing such that it may be physically rotated and retain its correct wiring connection to its circuitry. For example, the display may be detached, rotated manually, and re-attached. In this alternative embodiment, no coordinate-system re-mapping is necessary for the display 81 to display "upside down".

Once the CDO's main unit 20 is held in an "upside down" viewing position, any physical buttons that face the user, without special provision, would also appear upside-down to the user, individually and in their positions relative to one another. (In contrast, user buttons that are on-screen buttons (not illustrated in the Figs.) would automatically display correctly in left-handed mode, individually and relative to one another, after the display screen's image has been rotated about 180 degrees.) Physical button keypads generally can benefit from being rotated about 180 degrees, in whole or in part, in left-handed mode.

Various schemes for rotating physical buttons may be used. In one embodiment of the CDO, a user input keypad, or a portion thereof, may be physically loosened from any rigid attachment to the main unit 20, rotated about 180 degrees, and re-attached rigidly (e.g., "clicked in") to present a rotated placement. In another embodiment, a user input keypad is not physically moved but the buttons' functionality are re-mapped, e.g., by setting register(s) or switch(es) coupled to keypad controller circuitry within the main unit 20. After button functionality has been re-mapped, the icons displayed on the buttons may no longer match the buttons' functions. Therefore, a new membrane overlay (e.g., sticker or decal) may be provided to cover the buttons or to replace an existing membrane overlay. In a particular embodiment, the need for a new membrane overlay is avoided by re-mapping button functions if and only if the functions' buttons (e.g., physical buttons) display icons that, when read upside down, inherently correspond to the re-mapped function. For example, the FORWARD key is re-mapped to be the BACKWARD key, and vice versa, and the UP key is re-mapped to be the DOWN key (if up and down keys exist), and vice versa, because such keys' arrow icons inherently show the re-mapped direction when viewed upside-down. Further, if the function of a key does not semantically impose a spatial relationship with respect to another function, then the CDO preferably does not re-map that key's function in left-handed mode. (For example, whereas a FORWARD key should always be below a BACKWARD key, in a culture in which text reads downward in the forward direction, a CHANGE-VIEW key can semantically be in any arbitrary spatial relationship with other keys.)

Figure 2A:
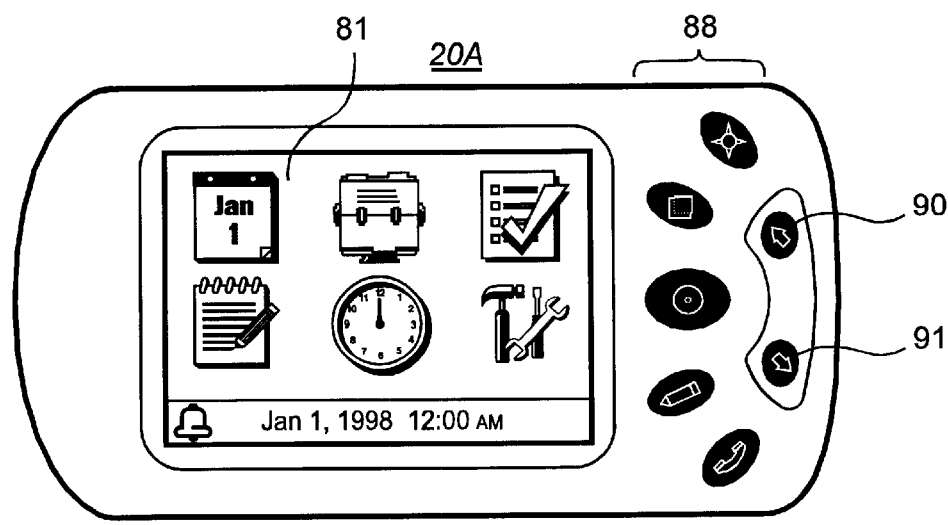
FIGS. 2A and 2B illustrate a main unit of a CDO in a right-handed mode and a left-handed mode, respectively, according to an embodiment of the present invention.
Figure 2B:
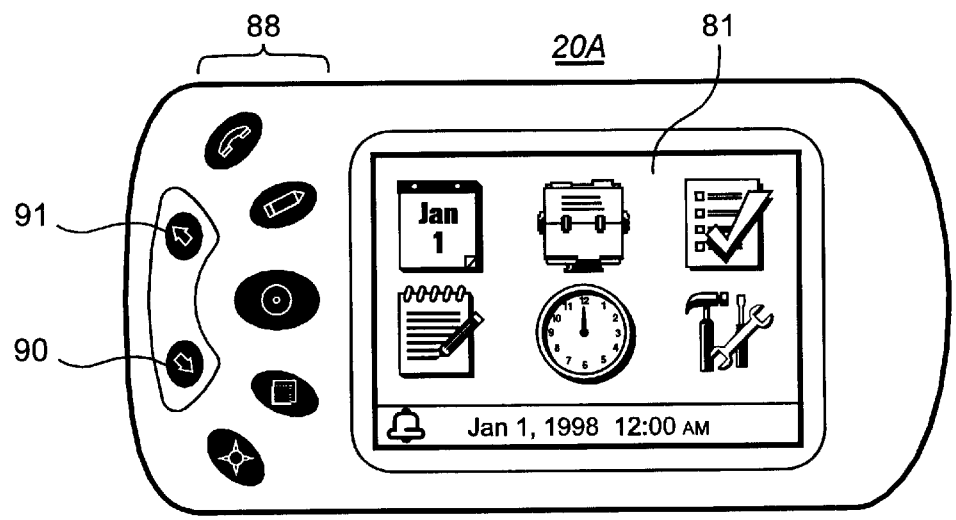

FIGS. 2A and 2B illustrate a main unit 20A in the right-handed mode and the left-handed mode, respectively, according to an embodiment of the present invention. In FIG. 2A, the display 81 is "correct-side-up" and primary input keys 88, including a key 90 and a key 91, face the user and reside to the right of the "correct-side-up" display 81. In the right-handed mode, the key 90 is mapped to the BACKWARD navigation function, and the key 91 is mapped to the FORWARD navigation function. The key 90 bears a left-up arrow icon and the key 91 bears a right-down arrow icon, which icons respectively show the BACKWARD and FORWARD navigation functions.

In FIG. 2B, the main unit 20A is in left-handed mode and is therefore viewed "upside down" by the user. The display 81 remains viewable because its coordinate system has been re-mapped to be upside down in the left-handed mode. The main unit 20A's primary input keys 88 now include keys with re-mapped functions. In particular, the key 90 is now mapped to the FORWARD navigation function and the key 91 is now mapped to the BACKWARD navigation function. No new membrane overlay or physical rotating of keys is necessary because the icon imprinted on each of the keys 90 and 91 when upside down resembles the icon imprinted on the other of the keys 90 and 91 when right-side-up. Note that other keys of the primary input keys 88 were not re-mapped, since their relative spatial relationships are not semantically constrained by their functions, and since their imprinted icons when upside-down do not inherently represent any function to which they might be re-mapped (e.g., any function originally mapped to another key when right-side-up).

3. An Included Speech Recognizer Supports Voice Control

A particular embodiment of the CDO as shown in FIG. 1A, or as shown in the incorporated, commonly-owned applications, for example, the applications having Ser. No. 09/071,732 (filed May 1, 1998) and Ser. No. 09/098,634 (filed Jun. 16, 1998), includes an input microphone coupled to its processor and speech-recognition software in its program memory such that the software can direct the processor to recognize speech input from the user (e.g., user says "John Smith") for looking up names in the phone list and for navigating to other views (e.g., user says "Calendar View"). Speech recognition software is well known, and is available from a number of vendors, for example: Advanced Recognition Technologies, Inc. of Delaware (headquarters in Chatsworth, Calif.) (http://www.artrecoinition.com/); Dragon Systems, Inc. of Newton, Mass. (http://www.dragonsystems.com/); IBM Corporation of Armonk, N.Y. (httD://www.ibm.com/).

4. Included Caller-Identification Logic Identifies Incoming Callers

A particular embodiment of the CDO as shown in FIG. 1A, or as shown in the incorporated, commonly-owned applications, for example, the applications having Ser. No. 09/071,732 (filed May 1, 1998) and Ser. No. 09/098,634 (filed Jun. 16, 1998), includes caller-identification (caller-ID) circuitry coupled to the system bus such that the CDO can: (1) instruct the host phone to allow the CDO to receive incoming-phone-call (e.g., "telephone ring") signals; (2) decipher caller-ID information provided by the telephone service provider in the incoming-phone-call signal to identify the caller's phone number; (3) search the CDO's phone book to find a match, if any, between the caller's phone number and a contact's phone number in the CDO's phone book; and (4) display the name of the contact (as well as the identified phone number) on the CDO's display to the user, so that the user can know the name of the caller before choosing to answer the phone call.

5. Physical Dimensions Maintain Compatibility with Belt Holsters

Note that while the main unit 20 in FIG. 1B is shown as having a generally rectangular shape, embodiments of the invention may be configured into other shapes. In particular, in an embodiment that is designed for possible use with Motorola StarTAC® phones, one side of the main unit 20 (e.g., the side having the Navi-Disk input keys 83) may taper into a narrower side, to better conform to the shape of the auxiliary battery for the StarTAC® phone. The tapered shape is similar to that shown on a CDO in the incorporated, commonly-owned patent application having Ser. No. 09/071,732 (filed May 1, 1998). For the embodiment for use with StarTAC® phones, a portion of the docking unit 10 may be narrower than the target StarTAC® phone so as to provide clearance for a standard holster (available from Motorola, Inc.) that holds the StarTAC® phone onto a waist belt. In particular, the narrowed portion may be along the two lateral sides of the docking unit 10, starting from the base side, which is the side having the connector 50. The (partial or full) narrowing would correspond to the "lateral recess" of a CDO that is described and shown in the incorporated, commonly-owned patent application having Ser. No. 09/071,732 (filed May 1, 1998). If necessary (e.g., if the docking unit is thinner than the desired "recess"), the main unit 20 may also have a housing that defines a recess, to provide additional clearance for the standard holster.

J. Further Discussion of Specific Embodiments

1. CDO Allows User to Dial From Any of Multiple Software Modules a. Typical Usage: Dial from a Contact Page In typical use, the user navigates the CDO's user interface to display or highlight a particular contact entry and from there invoke the DIAL-NUMBER command. In response, the CDO generates and issues a command to the target phone to dial the contact entry's phone number. If the contact entry has more than one phone number, the CDO uses the phone number that was highlighted by a cursor, if any, or the CDO first determines and displays a list of all non-empty phone-number fields for the contact entry and prompts the user to choose a number, which the CDO then uses for dialing. The CDO generates and issues the command to the target phone according to the target phone's communication and command protocol. An example of such a protocol is the standard modem "AT" command set, which is documented in the patent, trade, and technical literature. Interfacing with a target phone, as well as the "AT" command set, is further described, for example, in the incorporated, commonly-owned patent application having Ser. No. 09/071,732 (filed May 1, 1998).

b. Additional Usages: Dial from Non-Contact Page or Non-Phone Field

In the preferred embodiment of the CDO, the user may also navigate to displayed pages (e.g., views) that do not show a contact entry of the Contacts software module, or to pages that highlight a non-phone-number field of a record entry, and from those pages, invoke the DIAL-NUMBER command. For example, the user may navigate to a page that shows a calendar event, or to a page in which the user is viewing or editing the "subject" field of a "to-do" task, or to a page in which the user is viewing or editing the "body" field of a memo. From such a page, which does not highlight any phone-number field, the user invokes the DIAL-NUMBER command. The CDO responds by intelligently trying to deduce a phone number that is associated with the current page, prompting the user to confirm the phone number, and generating and issuing a command to the target phone to dial the deduced phone number c. CDO Determines Phone Number to Use Based on Invocation Context Upon invocation of the DIAL-NUMBER command, the CDO determines the phone number to be dialed, based on the context (e.g., the displayed page) under which the DIAL-NUMBER command was invoked. In the preferred embodiment, the determination is made according to the following method:

STEP 1: If the DIAL-NUMBER command was invoked from a displayed page in which a phone-number record field is highlighted, then the CDO uses the highlighted phone number, and the method is DONE. (The record field is either already stored as a number or is stored as a text string that can be simply parsed to produce a phone number.)

STEP 2: If the DIAL-NUMBER command was invoked from a displayed page in which a non-phone-number record field is highlighted, then the CDO attempts to parse the content of the highlighted (non-phone-number) record field to identify a text substring that is a phone number. After the parsing, if such a text substring was identified, the phone number is used, and the method is DONE. After the parsing, if no such text substring is identified, the CDO next attempts to deduce a phone number from the highlighted record field's record as if no record field had been highlighted, i.e., according to the STEPs 3 and 4 below.

STEP 3: If the DIAL-NUMBER command was invoked from a displayed page that shows or highlights a contact record, but does not highlight any particular field of the record, the CDO proceeds, as described earlier, to determine and display a list of all non-empty phone-number fields for the contact record and prompts the user to choose a number. Once the user chooses a phone number to be dialed, the method is DONE.

STEP 4: If the DIAL-NUMBER command was invoked from a displayed page that shows or highlights a non-contact record, but does not highlight any particular field of the record, the CDO attempts to parse the main field of the record to identify a text substring that is a phone number, as described for STEP 1. In an alternate embodiment, or for certain types of records (e.g., memo records), the CDO actually parses multiple or all fields of the record, identifies all phone numbers contained in the fields, and prompts the user to choose one of them. If no phone number is found in the record's main field (or all fields, for the alternate embodiment) proceed to STEP 5. If a phone number is identified, the method is DONE. The main field of a "to-do" task record is preferably its "subject" field, or the like. The main field of an event record is preferably its "subject" field, or the like. The main field of an e-mail record is preferably its "subject" field, or the like. The main field of a memo record is preferably its "subject" field, or the like, but if no separate "subject" field exists for the memo record, its entire "body" field, or the like, can be considered to be its main field.

STEP 5: (As reached from STEP 4.) If the non-contact record is associated with a contact record (e.g., the record's main field contains a name (e.g., "Joe Smith") that matches the name of a contact record), the CDO asks the user whether the user wishes to dial the contact record. If the user replies yes, proceed to STEP 3. Otherwise, no phone number has been identified, and the method is DONE. The determination of whether the non-contact record is associated with a contact record is further discussed in connection with a "Find-in-Contacts" feature in the incorporated, commonly-owned patent application having Ser. No. 09/187,007, filed Nov. 4, 1998.

The parsing of a text field to identify and extract phone numbers may be done in any suitable way. The parsing should depend on the format in which phone numbers are expected to be written, for a given user market. In the preferred embodiment, which is adapted for the United States market, the parsing algorithm is implemented according to the following source code snippet:

```
return
ScanNum(pNum,"1 (xxx) xxx-xxxx","?+?1?-?(ddd?)?-aaa?-aaaa",pString)
   || ScanNum(pNum,"1 (xxx) xxx-xxxx","?1?.?(ddd?)?.aaa.aaaa",pString)
   || ScanNum(pNum,"1 (A) xxx-xxxx","aaa-aaaa",pString)
   || ScanNum(pNum,"1 (A) xxx-xxxx","aaa.aaaa",pString)
   || ScanNum(pNum,"1 (A) xxx-xxxx","ddd?.dddd",pString)
```

In the above code snippet, ScanNum( ) is a string parsing function that accepts four arguments. The fourth argument, e.g., pString, is an input string to be parsed. The first argument, e.g., pNum, is an output string in which an identified phone number is to be stored, if parsing is successful. The second argument, e.g., "1 (A) xxx-xxxx", specifies the format of the result string that will contain the phone number, if parsing is successful. The third argument, e.g., "?1?.?(ddd?)?.aaa.aaaa", specifies the pattern to be matched in the input string. ScanNum( ) returns TRUE if and only if it succeeds in finding the desired pattern in the input.

In the second argument, the character 'x' is a placeholder for characters that are obtained from the input string; the character 'A' is a placeholder for the user's default telephone area code which is known to the function ScanNum( ); and all other characters are literal characters. In the third argument, the character 'a' is to be matched by any alphabetic character or digit in the input string, and the character 'd' is to be matched by any digit in the input string. Further, in the third argument, the character '?' followed by any character is to be matched by zero-or-more appearances of the character that follows '?'; a space character (i.e., ' ')is to be matched by zero or more appearances of whitespace character(s) in the input string; and all other characters are literal characters to be matched by the same character (case-insensitively) in the input string. Any character of the input string that is matched to the characters 'a' or 'd' of the pattern specification (i.e., of the third argument) is provided to the output string at the locations specified by the placeholder 'x' characters of the second argument. The above code snippet is but one parsing implementation that is made deliberately simple for high execution speed. Other parsing implementations are possible. For illustration, following are examples of input strings that can be successfully parsed into output strings by the above code snippet. In the examples, the user's default area code is "408".

| Input String | Output String |
| --- | --- |
| "blah blah 1.800.555.1212 blah blah" | "1 (800) 555-1212" |
| "blah blah 800 555 1212 blah blah" | "1 (800) 555-1212" |
| "blah blah +1 (800)555-1212 blah blah" | "1 (800) 555-1212" |
| "blah blah (800)CALLNOW blah blah" | "1 (800) CAL-LNOW" |
| "blah blah 8005551212 blah blah" | "1 (800) 555-1212" |
| "blah blah 555 1212 blah blah" | "1 (408) 555-1212" |

2. An Embodiment: Docking Unit Mates to Battery Compartment Opening

Figure 3A:
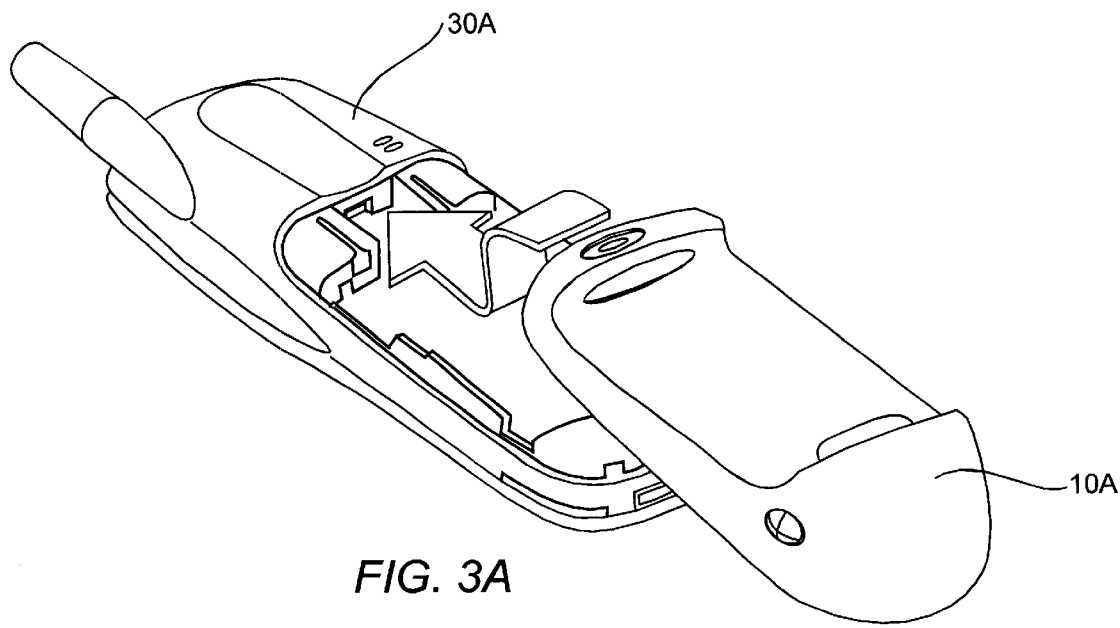
FIG. 3A illustrates a CDO's docking unit that attaches to a phone in the manner of a battery-compartment cover, according to an embodiment of the present invention.
Figure 3B:
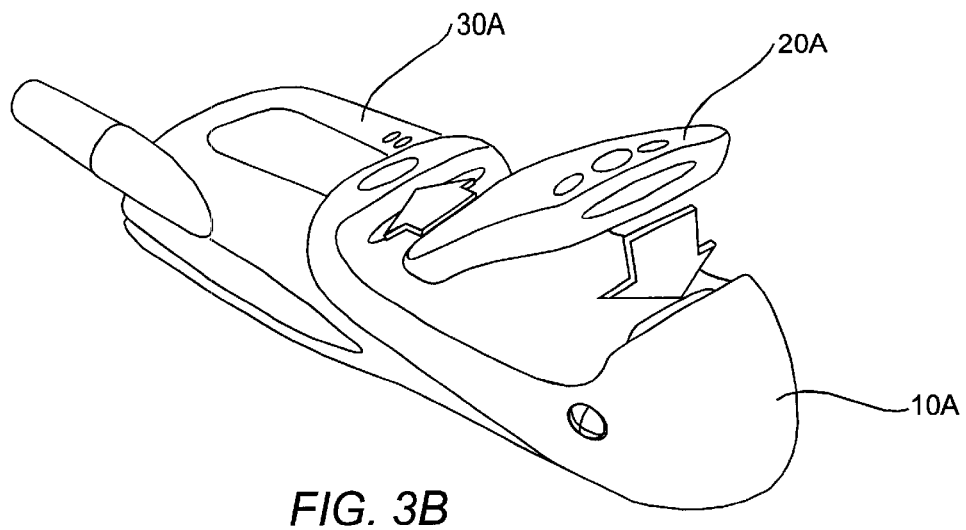
FIG. 3B illustrates a CDO's main unit being attached to the docking unit of FIG. 3A.

As mentioned above, a single main unit 20 is able to removably attach to a variety of docking units, wherein each docking unit is designed for a particular model or set of models of target phone. FIG. 3A illustrates a CDO's docking unit 10A according to a specific embodiment that attaches to a host phone 30A in the manner of a cover for an internal battery compartment, according to an embodiment of the present invention. In particular, a portion of the docking unit that makes contact with the host phone 30A conforms in shape to at least some portion of a battery-compartment cover. In particular the docking unit includes connectors that emulate the battery-compartment cover's connectors (e.g., snap-in tabs, and the like). FIG. 3B illustrates a main unit 20A being attached to the docking unit 10A of FIG. 3A.

3. Working with Multiple Models of Phones

Like the main unit(s) mentioned in earlier sections, the main unit 20A that is shown in FIGS. 3A and 3B preferably can dock with multiple types of docking units (e.g., battery-compartment-cover docking units, external-auxiliary-battery docking units, even built-in docking units, and the like. Built-in docking units are docking units for non-legacy phones, that are built-into the phone itself and need not or cannot be removed from the phone. To the extent that different target phones do not use a same communication protocol, a main unit that is to be docked to multiple docking units, for multiple target phones, may be loaded with phone-specific (e.g., phone-model-specific) software. Upon docking with a docking unit, such a main unit determines from the docking unit the model of the host phone, and selects and uses the software in the main unit's memory that is specific to the model of the host phone. In a particular embodiment, the phone-model-specific software is created and sold with each new model of docking unit, as new models of docking units are introduced for new models of host phones. In this way, the main unit can be updated as new models of phones are introduced. Phone-model-specific software, if any, is preferably transferred (e.g., installed) into the main unit (e.g., into flash-based memory in the main unit), for example via the serial port of the main unit from a personal computer. In an alternate embodiment, each docking unit may include an amount of memory (e.g., flash-based memory) that contains phone-model-specific software for instructing the main unit to work with the docking unit's compatible model(s) of phone. In this alternate embodiment, the main unit simply loads or uses the software from the docking unit for the docking unit's compatible model(s) of target phone. In another alternate embodiment, the docking unit itself includes a microcontroller or other processor, and associated memory and software, that translates between a protocol understood by the main unit and a protocol used by the docking unit's compatible model(s) of target phone.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments.

What is claimed is:

1. A method for cooperatively using a portable phone and a portable electronic organizer that has a display, the method comprising:

electively placing the portable electronic organizer into proximity with the portable phone to enable communication;

displaying at the display first information comprising entries having associated phone number information;

receiving first input that indicates a user request to place a phone call;

determining a phone number to be dialed as follows:

if a phone-number field is highlighted when the first input is received, determining that the highlighted phone-number is to be dialed; and if a non-phone-number field is highlighted when the first input is received, determining that a phone-number associated with the highlighted field is to be dialed comprising the steps of:

identifying a text substring that is a phone number involving parsing a pre-elected field of a current record, depending on a type of the current record, prompting the user to confirm the phone number, and repeating these steps until a phone number is confirmed;

transmitting a first command from the electronic organizer to the phone for attempting to establish communication between the electronic organizer and the phone;

if a communication can be established between the electronic organizer and the phone, transmitting in response to the user request a second command, from the electronic organizer to the phone, that instructs the phone to dial the determined phone number to thereby establish a phone call;

during the established phone call, receiving second input indicating a user request to use the electronic organizer to view second information; and in response to the second input, while at least a portion of the electronic organizer that includes the display is physically uncoupled from the phone, displaying at the electronic organizer the second information for viewing by the user while the user is actively engaged in the established phone call.

2. The method of claim 1 wherein the step of placing the electronic organizer into proximity with the phone comprises physically attaching the electronic organizer to the phone.

3. The method of claim 2 further comprising physically uncoupling the at least a portion of the electronic organizer from the phone prior to the step of receiving the second input.

4. The method of claim 2 wherein the step of placing the electronic organizer into proximity with the phone further comprises making electrical contact between signal conductors, and the step of transmitting the second command comprises transmitting the second command across the signal conductors.

5. The method of claim 2, wherein the phone is a cellular phone that accommodates a battery, and the step of physically attaching the electronic organizer to the phone comprises attaching the electronic organizer to the phone at a location intended for attaching the battery.

6. The method of claim 2, wherein the phone is a cellular phone that includes a battery compartment and a battery-compartment cover, and the step of physically attaching the electronic organizer to the phone comprises attaching the electronic organizer to the phone at a location intended for attaching the battery-compartment cover.

7. The method of claim 1 wherein the step of placing the electronic organizer into proximity with the phone comprises positioning the electronic organizer within about one meter of the phone, and the step of transmitting the second command comprises transmitting the second command wirelessly.

8. The method of claim 7 wherein the step of transmitting the second command wirelessly comprises transmitting the second command using infrared signals.

9. The method of claim 7 wherein the step of transmitting the second command wirelessly comprises transmitting the second command using radio-frequency signals.

10. The method of claim 1 wherein:

the electronic organizer includes a button;

the method further comprises activating the button by a first hand of the user while a second hand of the user is holding the phone at ear-side; and the step of receiving the second input includes detecting the activating of the button.

11. The method of claim 1 wherein:

the electronic organizer includes a first module and a second module that are physically separable from one another; and the step of placing the electronic organizer into proximity with the phone comprises electively and physically attaching the first module to the phone.

12. The method of claim 11 wherein the step of placing the electronic organizer into proximity with the phone further comprises electively and physically attaching the second module to the first module.

13. The method of claim 12 wherein the step of placing the electronic organizer into proximity with the phone further comprises making electrical contact between signal conductors, and the step of transmitting the second command comprises transmitting the second command across the signal conductors toward the phone.

14. The method of claim 13, wherein the phone is a cellular phone that accommodates a battery, and the step of physically attaching the first module to the phone comprises attaching the first module to the phone at a location configured for attaching the battery.

15. The method of claim 11, wherein the phone includes a battery-compartment cover, and the step of physically attaching the first module to the phone comprises attaching the first module to the phone at a location configured for attaching the battery-compartment cover.

16. The method of claim 1 wherein:

the phone uses a first command protocol;

the second module uses a second command protocol; and the method further comprises translating between the first and the second protocols by the first module to facilitate communication between the second module and the phone.

17. The method of claim 1 wherein the electronic organizer includes contact information and event information; and the second information includes information from at least one member of the set consisting of the contact information and the event information.

\* \* \* \* \*